United States Patent
Garcia Morchon et al.

(10) Patent No.: US 10,190,879 B2
(45) Date of Patent: Jan. 29, 2019

(54) SYSTEM AND METHOD FOR DETECTING GROUND POSITION CHANGES

(71) Applicant: PHILIPS LIGHTING HOLDING B.V., Eindhoven (NL)

(72) Inventors: Oscar Garcia Morchon, Aachen (DE); Marc Aoun, Eindhoven (NL); Miguel Elcano-Fuentes, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/747,222

(22) PCT Filed: Jul. 11, 2016

(86) PCT No.: PCT/EP2016/066402
§ 371 (c)(1),
(2) Date: Jan. 24, 2018

(87) PCT Pub. No.: WO2017/016862
PCT Pub. Date: Feb. 2, 2017

(65) Prior Publication Data
US 2018/0216934 A1     Aug. 2, 2018

(30) Foreign Application Priority Data

Jul. 27, 2015  (EP) .................................. 15178507

(51) Int. Cl.
*G01C 15/04* (2006.01)
*G01S 19/09* (2010.01)
(Continued)

(52) U.S. Cl.
CPC .............. *G01C 15/04* (2013.01); *G01S 19/09* (2013.01); *G01S 19/39* (2013.01); *G01S 19/42* (2013.01); *G01S 19/51* (2013.01); *G01C 15/00* (2013.01)

(58) Field of Classification Search
CPC ......... G01C 15/04; G01S 19/09; G01S 19/39; G01S 19/42
(Continued)

(56) References Cited

U.S. PATENT DOCUMENTS 4,403,459 A * 9/1983 Hurlbut .................. G01C 15/04
                                                                    405/130
2002/0152053 A1   10/2002 Roy et al.
(Continued)

FOREIGN PATENT DOCUMENTS

| EP | 2270544 A2 | 5/2011 |
|---|---|---|
| WO | 2011121470 A1 | 10/2011 |
| WO | 2015022213 A1 | 2/2015 |

*Primary Examiner* — Roy M Punnoose
(74) *Attorney, Agent, or Firm* — Meenakshy Chakravorty

(57) ABSTRACT

A system for detecting localized ground position changes makes use of plurality of lighting units, each fixed to the ground. Each lighting unit comprises a positioning system and a transmitter for transmitting positioning information to a remote central processing unit. The positioning information from the plurality of fixed lighting units is processed to identify local ground position changes. The infrastructure of a networked lighting system in this way enables ground information to be determined, for example for detecting ground movement in response to natural events or man-made activities (such as tunneling, building, extraction of natural resources etc.).

13 Claims, 5 Drawing Sheets

(51) Int. Cl.
  *G01S 19/39*   (2010.01)
  *G01S 19/42*   (2010.01)
  *G01S 19/51*   (2010.01)
  *G01C 15/00*   (2006.01)
(58) Field of Classification Search
  USPC .......................................................... 356/614
  See application file for complete search history.

(56) References Cited

U.S. PATENT DOCUMENTS

| | | | |
|---|---|---|---|
| 2007/0030841 A1* | 2/2007 | Lee ..................... | G01S 5/0027 370/352 |
| 2009/0034258 A1 | 2/2009 | Tsai et al. | |
| 2009/0099707 A1* | 4/2009 | Greiner ................ | E02F 9/2045 701/1 |
| 2013/0181636 A1 | 7/2013 | Agrawal | |
| 2014/0266873 A1* | 9/2014 | Pighin .................... | G01S 19/40 342/357.23 |
| 2014/0293993 A1* | 10/2014 | Ryhorchuk ............ | H04L 67/12 370/350 |
| 2017/0233230 A1* | 8/2017 | Kendall ................... | B66F 7/28 187/215 |

* cited by examiner

SYSTEM AND METHOD FOR DETECTING GROUND POSITION CHANGES

CROSS-REFERENCE TO PRIOR APPLICATIONS

This application is the U.S. National Phase application under 35 U.S.C. § 371 of International Application No. PCT/EP2016/066402, filed Jul. 11, 2016, which claims the benefit of European Patent Application No. 15178507.8, filed on Jul. 27, 2015. These applications are hereby incorporated by reference herein.

FIELD OF THE INVENTION

This invention relates to a system and method for detecting position changes, such as caused by natural events or by human excavations or other activities nearby.

BACKGROUND OF THE INVENTION

Geo-location is the identification of the real-world geographic location of an object. Geo-location changes of a terrain or building refer to changes in geographic location of the terrain or building, and such changes may arise as a result of construction work in the surrounding area, natural movement of the ground, or extraction of gas or water or other natural resources that leads to movement of the ground.

Being aware of these position changes is of key importance to ensure safety in cities or reduce maintenance costs of infrastructure. However, there is a lack of accurate geo-location information in respect of buildings. There is also a need for a method to detect such geo-location changes in accurate manner.

SUMMARY OF THE INVENTION

The invention is defined by the claims.

According to examples in accordance with an aspect of the invention, there is provided a system for detecting localized ground position changes within an overall area, comprising:
 a plurality of lighting units each fixed to the ground and mounted within the overall area, wherein each lighting unit comprises a movement detection and/or positioning system and a transmitter for transmitting positioning and/or movement information to a remote central processing unit; and
 the central processing unit for receiving the positioning information from the plurality of lighting units and adapted to process the received positioning and/or movement information to identify local ground position changes.

This system makes use of a lighting infrastructure to provide monitoring of ground movements within an area. These ground movements are known as geo-location changes, wherein a geo-location is the identification of a real-world geographic location of an object. Geo-location changes are of interest for buildings (for example to assess earthquake damage) but also for terrains. In particular, any geo-location changes in a terrain generally will result in associated movement of buildings on the terrain. This invention relates in particular to tracking the geo-location of terrains. Changes may be caused by construction activities in the surroundings, natural movements of the ground, weather (e.g., heavy rain), or extraction of gas or water or other natural resources. Methods and systems described in this document may also be applied to monitor movements over large terrain areas, such as may be caused by the movement of tectonic plates for instance.

The central processing unit has an output which provides a measure of the geo-location changes.

Measuring these geo-location changes is extremely important to assess the safety of an area or carry out maintenance works before the geo-location changes are too large such that maintenance becomes too expensive.

It has been suggested for example that movements of a building of more than 2 mm should trigger a warning. It is known to use satellite information or sensors to measure geo-locations of buildings. However, the accuracy, either spatial or temporal, is not always sufficient. The invention makes use of a lighting infrastructure to provide a distributed network of sensors, which provides much more information about the terrain at and between buildings.

In an embodiment, the movement detection or positioning system of each lighting unit comprises a positioning system, which pre-processes the position data obtained during an interval of time thereby to derive the positioning information to be transmitted. This pre-processing may be an averaging operation. This time averaging improves the data accuracy. The time period is for example at least 1 hour. It may be multiple hours, for example 8 hours, or even a day or multiple days.

The pre-processing may instead comprise applying thresholds to the information so that changes are identified, and the magnitude of these changes can then be reported.

All data may instead be provided to the remote central processing unit, for example in real time, where all of the data processing may then take place. This requires more data transfer but less data processing locally.

When the data is pre-processed, the central processing unit may also be adapted to further process (e.g. further average) the positioning information received over a number of the time periods. Thus, data may be reported from the lighting units every 8 hours for example, and three such data events may be averaged to provide a daily data value.

The central processing unit is for example adapted to identify a local ground position change based on position and/or movement information from a plurality of lighting units in close proximity to each other having correlated ground position changes.

The correlated position changes may for example correspond to:
 position changes in the same direction; or
 position changes towards a common point; or
 position changes away from a common point.

These different movement conditions may be representative of different natural events or human activities.

The lighting units may comprise a plurality of sensing technologies to measure the position and movement and the remote central processing unit may combine the data obtained from the lighting units with further data. The different sensing technologies may for example include positioning systems such as GPS and movement sensors such as accelerometers. Additionally, other sensors such as sound sensors or wind sensors might be combined to improve the accuracy of certain measurements.

According to at least a subset of embodiments, the system may further comprise at least one static reference unit comprising a movement detection and/or positioning system and a transmitter for transmitting movement and/or positioning information to the remote central processing unit, and wherein the central processing unit is adapted to identify position changes of one or more of the lighting units relative to the at least one static reference unit.

Optionally, the remote central processing unit may, in these examples, be adapted to identify a local ground position change by a process of averaging or comparing determined position changes of a plurality of lighting units relative to the at least one static reference unit.

Examples in accordance with another aspect of the invention provide a method for detecting localized ground position changes with an overall area, comprising:

transmitting positioning and/or movement information from a plurality of lighting units, each fixed to the ground and mounted within the overall area, to a remote central processing unit;

at the central processing unit, processing the received positioning and/or movement information to identify local ground position changes.

The position may be pre-processed, for example averaged, over a time period before each transmission to the remote central processing unit. At the remote central processing unit, the positioning information received over a number of the time periods may also be averaged.

By correlating the ground position changes for a plurality of the lighting units, local ground position changes may be identified based on the correlation information.

In one example, a local ground position change may be determined based on a minimum percentage of lighting units within a localized area having a correlated ground position change with an amount of position change exceeding a threshold.

In a different embodiment, there is a proxy device between the lighting units and the remote central processing unit that performs data processing. In this embodiment, the lighting units send positioning and/or movement information to the proxy device, the proxy device processes and aggregates the data of each single lighting unit or a combination of them, and sends the aggregated information to the central processing unit.

In a different embodiment, raw positioning and/or movement information is sent to either the central processing unit or proxy device. This ensures that data aggregation and processing can be performed on the raw data of multiple devices improving the accuracy of the system.

In a different embodiment, the positioning and/or movement system implemented in a lighting device is based on combination of sensor sources. One of those sensor sources is a global positioning system but other sensor sources might be an accelerometer or air pressure sensor. Although the last two sensor sources do not provide global position information, they provide information on position movements derived from changes in acceleration or pressure. This information can be correlated improving accuracy of the system.

Sensor sources may also include sound sensors and/or wind sensors. Sound sensors may be used in combination with speakers to provide acoustic measurements of the distances between pluralities of sensors (using estimates of the speed of sound, which may in examples be calculated dynamically in response to environmental information). This may enable calibration of sensors or correction of certain errors in GPS position data.

Wind sensors may improve accuracy in some cases by enabling identification of erroneous movement measurements caused being by wind forces being applied to sensors, rather than terrain movements.

The method may be implemented in software.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a system for detecting localized ground position changes within an overall area. A plurality of lighting units are each fixed to the ground within the overall area, and each lighting unit comprises a positioning and/or movement detection system and a transmitter for transmitting positioning information to a remote central processing unit. The positioning and/or movement information from the plurality of fixed lighting units is processed to identify local ground position changes. The infrastructure of a networked lighting system in this way enables ground movement information to be determined, for example for detecting ground movement in response to natural events or man-made activities (such as tunneling, building, extraction of natural resources etc.). Preferably, the lighting units include at least an absolute positioning system such as GPS, and then addition sensing systems may provide further information such as acceleration information or other indicators of movement.

There already exist networked street lighting solutions. The network for example enables online determination of how much energy street lights are using and which ones need repair. Full control is enabled of the lighting provided, for example enabling schedules and dimming levels to be set on demand. One such solution is the CityTouch® product of Philips®. It provides a simple web application to manage street lights remotely and analyze lighting data including energy usage and luminaire status.

Each luminaire includes a central processing unit (CPU), and communications module (e.g., using the General Packet Radio Service, GPRS), as well as a positioning module such as a GPS module. The GPS module is used to provide location information, for example for auto-commissioning and auto-locating.

It has been proposed to use the positioning information to detect when a light pole has been deformed, for example caused by an impact with the light pole. This can be determined based on movement of the light pole by an amount greater than that which is expected in normal use. This approach is described in WO 2015/022213.

This invention makes use of the positioning information collected by a network of lighting units (e.g. light poles) in order to provide information about local ground movements.

Figure 1:
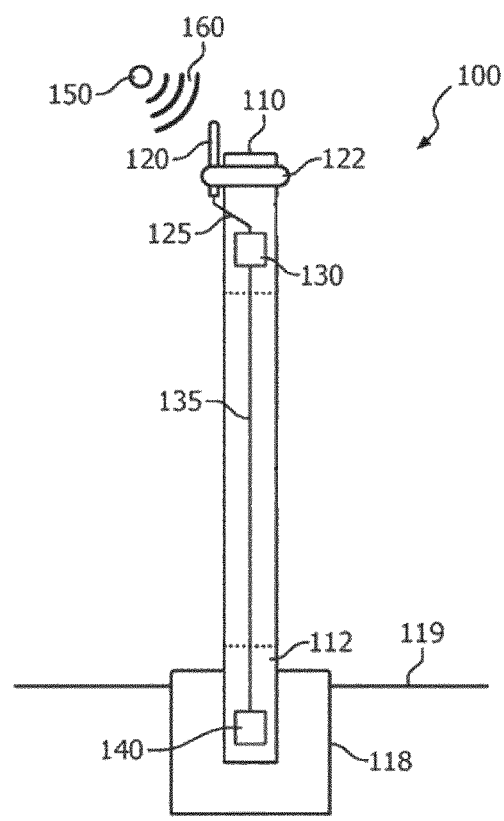
FIG. 1 shows a lamp pole which may be used as part of a system for detecting localized ground position changes.

FIG. 1 shows a lighting unit 100 which may be used as a part of a system of the invention for detecting localized ground position changes.

The lighting unit comprises a light pole 110. The pole 110 comprises a base 112 at which the pole is fixed to the ground. In the example shown, the base 112 is fitted to a concrete socket 118 in the ground 119. A GPS antenna 120 is coupled to the top of the pole 110, for example through a tie wrap 122. In this example, the antenna 120 is coupled to the top of the pole 110. The antenna 120 could however be coupled to the pole 110 at a different position, for example at the base 112, at a certain distance (e.g. 1 meter or 2 meters) from the base 112, or halfway up the pole 110. The lower down the pole the antenna is positioned, the less movement of the pole is expected at that location through normal deformation, but the more the wireless signal may be shielded, for example by foliage.

One advantage of mounting a position sensor higher up a lamp pole is that ground movements are magnified at the location of a position sensor. A small change in the angle of the base, caused by a ground movement change, will be magnified to a large linear displacement at the tip of the pole. For example, a 1 degree change in the angle of the base of a 5 m pole gives rise to a 9 cm movement at the tip.

The antenna 120 is coupled by line 125 to a signal processor 130 which is in turn coupled to an interface 140 by line 135. The antenna 120 is arranged to receive, from a wireless signal source 150, a wireless signal 160. The signal processor 130 is arranged to determine, based on the wireless signal 160 as received through the antenna 120, positioning information.

The interface 140 is used to communicate the positioning information with a remote central processing unit, which receives the positioning information from a plurality of the fixed lighting units. The remote central processing unit processes the received positioning information to identify local ground position changes.

The interface 140 may communicate with the remote central processing unit over a wireless or wired connection.

The wireless signal 160 received by the antenna 120 can be global, regional or local positioning data received from, for example, a satellite. The US government maintained Global Positioning System (GPS) is a collection of satellites each comprising a wireless signal source 150 providing a wireless signal 160. Other examples are the Russian GLONASS satellite system, the European Galileo satellite system, the Chinese Beidou and COMPASS satellite systems, the Indian IRNSS satellite system and the Japanese QZSS satellite system.

The wireless signal 160 broadcasted by such systems contains information, such as orbital data, syncronization codes, carrier signal, and signal transmission time, that allow the signal processor 130 to determine position data; in this case geographical location data such as coordinates.

The final positioning information is ideally accurate to within 5 mm (in terms of the movement at the ground level, rather than the movement at the sensor location, as these may be different as explained above), more preferably within 3 mm and even more preferably within 2 mm.

The raw signal received from GPS is prone to accuracy errors, either random or constant, due to the type of antenna used, processing in the receiver, atmospheric effects, multipath effects, and natural and artificial interference. The standard accuracy of GPS is around 15 m. There are augmented methods to improve that accuracy, e.g., using differential GPS an accuracy of around 3 m can be achieved. Similarly, the transmission and reception of more than one signal at different frequencies can help removing the atmospheric effects further improving the system accuracy. Those errors that have a random nature and are characterized by a mean value equal to zero can be removed by averaging the samples collected over a given period of time.

Thus, to improve the accuracy of the positioning information, the application running on the GPS receiver in one set of examples collects the measured GPS data over a period of time T and computes the average value. Every time period T, the calculated average value is then sent to the remote central processing unit (i.e. to the backend system). A value for T is for example an hour or longer, for example 8 hours. It may even be longer, for example a number of days.

A different alternative to improve the accuracy of the position information gathered by the receivers in the lighting units consists in correcting errors due to atmospheric effects in the central management unit. The position estimation might be based on a single signal frequency, and thus, it is prone to those atmospheric errors. The central management unit can be registered to other location receivers, providing a correction factor for this error source. A similar approach that allows this goal to be achieved consists in having simple receivers prone to atmospheric errors and more complex (and therefore expensive) receivers that can determine and correct this error. Those more complex receivers would not only send their estimated location to the central processing unit, but also the estimated error. Since receivers in close vicinity (a few kilometers) will be affected in a similar way, this estimated error can be used to improve the values of the rest of devices.

Another way of further removing errors is based on the knowledge of the distance between light points. This distance can be known in advanced and remains fixed during the entire lifetime of the system.

Figure 2:
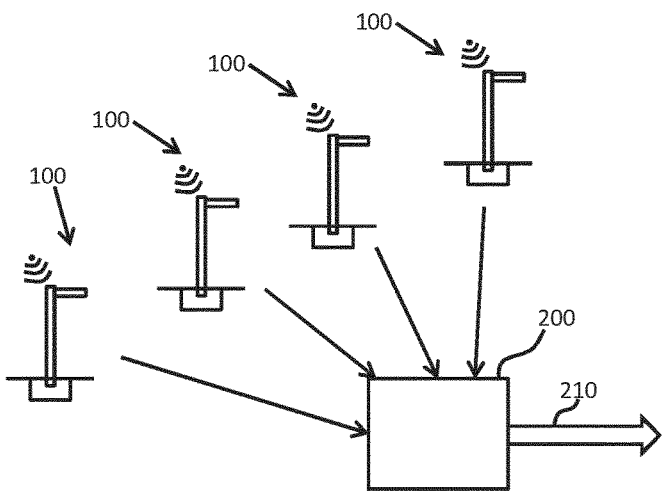
FIG. 2 shows a system for detecting localized ground position changes.

FIG. 2 shows a number of lighting units 100 which all provide data to the remote central processing unit 200. It performs processing to identify local ground position changes, as represented by the output 210.

The lighting units are all shown as light poles. However, the network may include wall mounted lights, ground mounted lights, or lights mounted on other structures such as bridges and tunnels. Such lighting units are still to be interpreted as fixed to the ground, in that there is still a rigid structure between the lighting unit and the ground so that the position of the lighting unit is intended in normal use to be static. The network may also be advantageously extended in example applications to include certain non-lighting devices containing position and/or movement sensors, such as for example smart energy monitors, or any other variety of device which tends to be distributed in large numbers across a broad region of terrain.

The network of lighting units may include hundreds of thousands of devices. For instance, the number of lighting units in a city like Los Angeles or Buenos Aires is tens of thousands of devices. Therefore, this provides a very dense grid of sensed values. The system covers any area where lighting is needed, and therefore, where human constructions or activity takes place. This ensures that the system is deployed where soil movements need to be detected. Typical areas are roads, streets, parking lots, power plants, factories, parks, etc. In such deployment scenarios, lighting units are typically separated a fixed distance equal to a few meters, e.g., ten or twenty meters.

The application on the remote central processing unit 200 keeps track of the measured GPS locations reported to it by each connected GPS receiver. The application may also average out data over a longer period of time than the reporting period T, with the aim of further removing noise.

The remote central processing unit 200 aims to identify regions where there is significant ground movement, which can be indicative of ground problems which may require remedial work.

The overall area covered by the full system is divided into sub-areas. The sub areas may be discrete or they may overlap. For example the overall area may be divided into a hexagonal (or square) grid, with each hexagon (or square) forming a sub-area. Instead of a perfect grid, the sub-areas may overlap. There is then an array of sub-area centers (a square grid array or a hexagonal grid array), but each sub-area is larger than would be needed to form a tessellation. The sub-areas may be circular.

Figure 3:
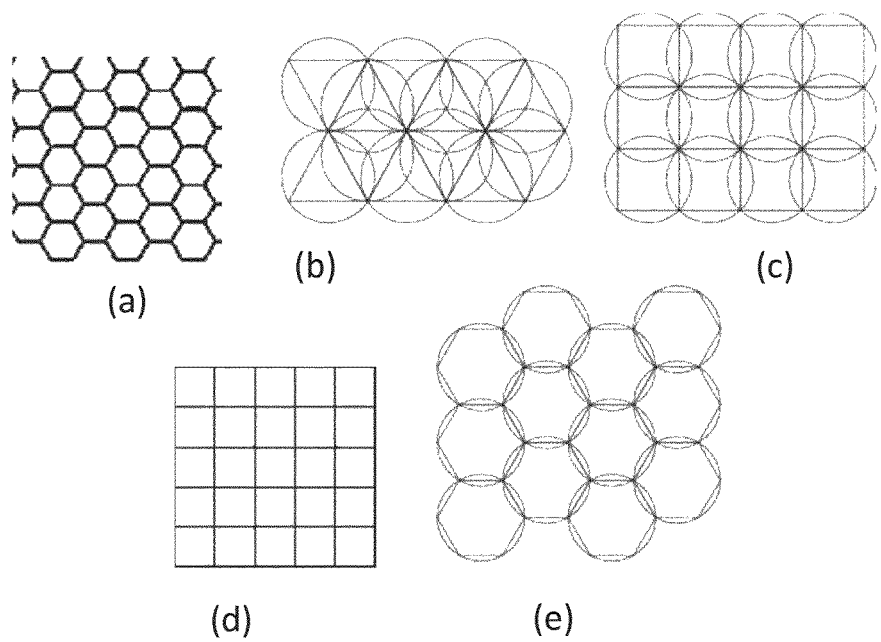
FIG. 3 shows how an area may be divided into sub-areas.

FIG. 3 shows various sub-area shapes. FIG. 3(*a*) shows a tessellated array of hexagonal sub-areas. FIG. 3(*b*) shows circular sub-areas with centers on a triangular grid. FIG. 3(*c*) shows circular sub-areas with centers on a square grid. FIG. 3(*d*) shows a tessellated array of square sub-areas. FIG. 3(*e*) shows circular sub-areas with centers on a hexagonal grid. Other shapes are squares and rectangles that match well how lighting units are deployed, e.g., in parking lots or streets. A different approach is to take any of the shapes above and use it as a sliding window throughout the overall area so that the data coming from the lighting units in the window are correlated. One of these sub-areas can be a few hundreds of square meters so that it can contain a few tens or hundreds of lighting units.

In order to determine a local ground movement, the different sub-areas are processed. For a given sub-area, the position signals (in particular changes in those signals) from the lighting units within that sub-area are correlated.

Within one of those areas, different correlations are possible.

A first correlation may relate to position changes in the same direction.

A second correlation may relate to position changes towards a common point.

A third correlation may relate to position changes away from a common point.

A further aspect for correlation refers to the period of time over which such a change is observed. This can be between samples or over multiple samples.

Another further aspect for correlation refers to the variability of movement in a given area (the area of the movement) compared with other areas (without movement).

The positioning information from the lighting units within a sub-area is processed to identify the presence of one or more of these different possible correlations. These different movement conditions may be representative of different natural or man-made events. For example a large excavation at a site may result in movement towards that site. Drilling at a site may result in movement away from that site. A land slide may result in movement in the same direction.

The correlation function can be constructed in different ways. If it is assumed that each lighting unit sends a single value with its estimated location on a regular basis (e.g., every second, minute, hour, day), then the central processing unit can then compare the current obtained value with the previous one or a history of the previous ones (previous value or an average value during a period T of the samples in the past at some time (e.g., one year ago)).

This comparison can be based on the difference of those samples. Having these differences, the central processing unit can then analyze whether this information is correlated. For instance, if the movement of each lighting unit i between two time instants is determined by a vector $M=(m_{ix}, m_{iy}, m_{iz})$, then the addition of all movement vectors belonging to lighting units in a given area A can be computed as $M_{i\text{-}in\text{-}A}=M_1+M_2+\ldots+M_i$.

If there is no movement, then the components in (x, y, z) of different lighting units will be uncorrelated and it will remain close. However, if there is some movement in a given direction, e.g., in x axis, then there will be a correlation in that direction and the size of that vector component will be larger. By comparing the size of the vector components with a reference value dependent on the number of lighting units in an area, it is then possible to determine whether movement has happened or not.

Alternatively, in some cases (for example where global error, due to interference of the ionosphere or satellite errors, is relatively large), there may be observed a general correlation across most devices (caused by error), but with certain individual devices derrogating from that correlation. By comparing (x, y, z) components of the overall combined unit vector M with each of the individual movement vectors (and with the reference value dependent upon the number of lighting units in an area). it may be identified whether there exist certain individual lighting units among the network which are outliers to the general observed correlation. In this case, this may be an indication that the non-correlated units are moving, while correlated ones are not.

This description applies to the case in which all the devices move in the same direction. If instead the lighting units move towards or away from a point, then a similar approach can be carried out by using a different coordinate system, e.g., polar or spherical coordinate system. For such a coordinate system, the pole of the system (center of the spherical coordinate system) is in the center of the area (e.g., a circle or and sphere) under observation and the movement of each of the lighting units is considered under this coordinate system. If there is a movement in and away based on of the direction of the pole of the system, then the size of the added movement vector computed by adding all the movement vectors of all the lighting units will be small. If only the addition of the movement vectors of the lighting units in half of the area is implemented, then the vector will not be small. In this way movement towards or away from a point may be detected. Other approaches are feasible to perform the correlation of signals. For instance, if the lighting units have different types of sensor, e.g., an accelerometer as well as a positioning system, then each device can locally process the data and analyze whether a fast acceleration has taken place. In this case, the lighting unit can trigger an event and all the events will be sent to the central processing unit. If the events have happened in a close area and at the same time and the acceleration is correlated (e.g. high acceleration measured by all lighting units), then it can be derived that a soil movement has happened.

This information can then also be combined with information coming from the positioning sensor (e.g., GPS) to obtain estimation on the movement.

By way of example, a trigger may be generated which indicates a ground movement event if a correlated change of location (i.e. exceeding a correlation threshold) of a percentage p of GPS receivers with the sub-area is detected.

For example, within the sub-area, a percentage p of GPS receivers move more than a threshold T in a given direction D.

Alternatively, within the sub-area, a percentage p of GPS receivers move more than a threshold T towards a point P.

Figure 4:
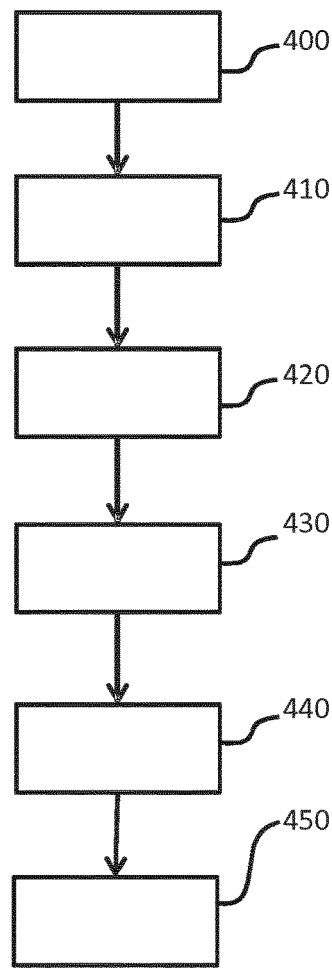
FIG. 4 shows a method for detecting localized ground position changes.

FIG. 4 shows a method for detecting localized ground position changes with an overall area. In step 400, positioning information is received by a plurality of lighting units, each fixed to the ground.

In step 410, the positioning information is averaged over a time period (or pre-processed in a different way), and then transmitted to a remote central processing unit or a proxy device. The transmission may instead be in real time.

In step 420, at the central processing unit, the received positioning information is optionally further averaged over time to improve the accuracy.

In step 430, correlation functions are calculated.

In step 440 the correlation functions are processed to identify local ground position changes.

The local ground movements may then be displayed on a display of a user interface device. This movement information is for example overlaid over a map of an the overall area of interest, with data values and/or color coding to signify the degree of ground movement being reported by the array of sensors of the lighting infrastructure.

The invention is based on the use of a number of connected location sensors such as GPS receivers and/or others deployed in the area in which a geo-location change is to be measured. The location sensors measure, process, and send location data to a backend system. The backend system hosts an application to process the received location information of the location receivers.

As mentioned above, averaging of the positioning information provides improved accuracy in the case of GPS receivers. Future positioning systems, such as Galileo will provide much more location accuracy than GPS.

The most basic embodiments and applications of the invention have been described above. In the description below will now be presented a more in-depth discussion of a range of particular variations and approaches which may be applied in accordance embodiments with the invention, as well as discussion of some aspects of the theory and mathematics underlying many of the discussed embodiments. In particular, it will be discussed how application of the various approaches, or variations thereof, may act to reduce, mitigate or eliminate various sources of error from measurement and detection of movement events.

For the purpose of the following description, it is assumed that there exists a network formed by a number G of lighting devices (or 'nodes'), each containing a GPS receiver and adapted to communicate measured position information. For a given device i, each measured position value generated by the device (each 'sample') is denoted $x^{(i)}(n)$, where n is a dummy variable for indexing the generated samples.

As discussed above, it is an aim of embodiments of the present invention to enable accurate detection of the occurrence of ground or soil movement events. Detection of the movement of a region of interest (ROI) corresponds to the detection that $x^{(i)}_{Real}(n) \neq x^{(i)}_{Real}(n+1)$ for one or more devices i located within that region, where $x^{(i)}_{Real}(n)$ is the real value of a receiver's position (without error).

In the case of a receiver free from errors, the detecting of movements of any region of interest would simply correspond to the detection of measured velocity values $v^{(i)}(n)$ of devices within that region which are greater than zero. However, in any real world system, each node is highly likely to be affected by a range of different sources of error. Hence, without some further processing or analysis of raw measured values, it cannot be assured for certain whether or not movement in a given region is occurring.

In particular, one may measure positive values of $v^{(i)}(n)$ when in fact there is no movement at all. Or one may measure zero $v^{(i)}(n)$, when there is movement occurring, or one may measure a positive value when there is movement, but having a magnitude which is not accurate (thus giving a false impression of the size of the movement event in that region).

A number of sources of error may affect any given lighting device (node) within a system. These errors are associated in particular with GPS devices. GPS errors affecting the measured position of a node may be divided into two broad groups:

Local errors—errors associated with the local environment within which a single node is located Global errors—errors which are common across a set of receivers placed in close vicinity.

Within each of these groups, the experienced error can be further sub-categorized in terms of the type of noise which is generated by the error:

White noise: no relation or pattern between error values incurred; the errors values have a random distribution Colored noise: correlated error values—error values follow some pattern or non-random distribution.

Table 1 below outlines a variety of different sources of error which may affect a static device, and the group and sub-category of that error source according to the above descriptions. For each source of error, the type of noise is categorized according to that which is experienced most persistently or frequently, and considering only samples taken over a short period of time (e.g. samples taken every second). Samples separated by a longer time period may become more white than colored. For instance, multipath error measured over a long period of time may exhibit a more white nature, particularly in a changing environment.

TABLE 1

| Error | Type | Noise |
| --- | --- | --- |
| Receiver (Noise) | Local | White |
| Receiver (Clock) | Local | Colored |
| Multipath | Local | Colored |
| Troposphere | Global | Colored |
| Ionosphere | Global | Colored |
| Ephemeris | Global | Colored |
| Satellite (Clock) | Global | Colored |

As may be seen from the table, most errors (in the present case of static nodes) include noise which is mostly colored, since most of these errors change in a continuous way (GPS satellites are moving progressively so that consecutive signals tend to exhibit a strong correlation). Noise within the receiver itself on the other hand is mostly white noise.

Figure 5:
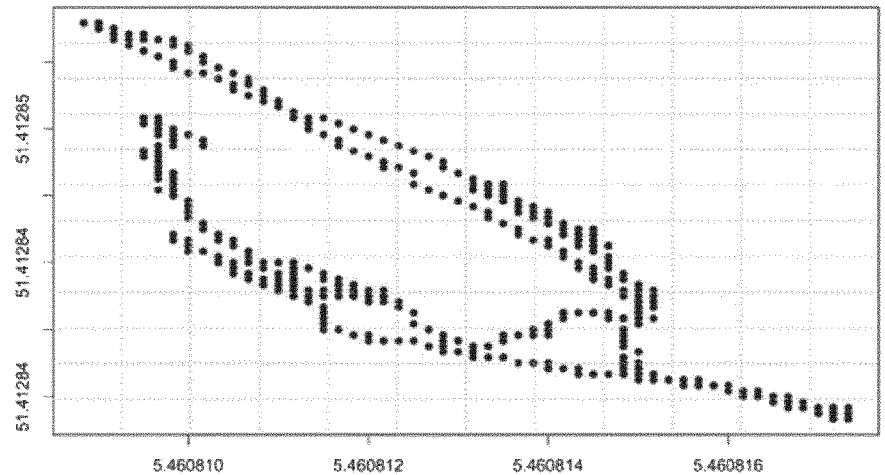
FIG. 5 shows an example progression of measured position values caused by the presence of error.

Given the large number of sources of error, the measured position values ($x^{(i)}(n)$) of an entirely static device i do not stay constant as they ought to, but rather change over time. Furthermore, given the strong presence of colored noise in the incurred error, measured values of $x^{(i)}(n)$ do not change randomly, but rather in a progressive (i.e. systematic) way. An example progression of measured position values $x^{(i)}(n)$ of a static node, caused by the presence of error, is shown in FIG. 5, in which the y axis represents latitude (in decimal degrees), and the x-axis represents longitude (in decimal degrees). The period between measurements n is one second and this is measured during a time of 900 seconds.

It may be observed, that although the measured values change over time, thereby giving a false positive velocity reading, the progression is slow. i.e. $dx^{(i)}(t)/dt = x^{(i)}(n+1) - x^{(i)}(n) = v^{(i)}(n)$ is small.

From this fact, it is possible to derive an experimental probability distribution function for $v^{(i)}(n)$. An exemplary probability distribution function corresponding to a large number of sample values taken for a static device being affected by error is shown in FIG. 6, in which the y axis represents the probability and the x axis represents velocity (in cm/s).

Figure 6:
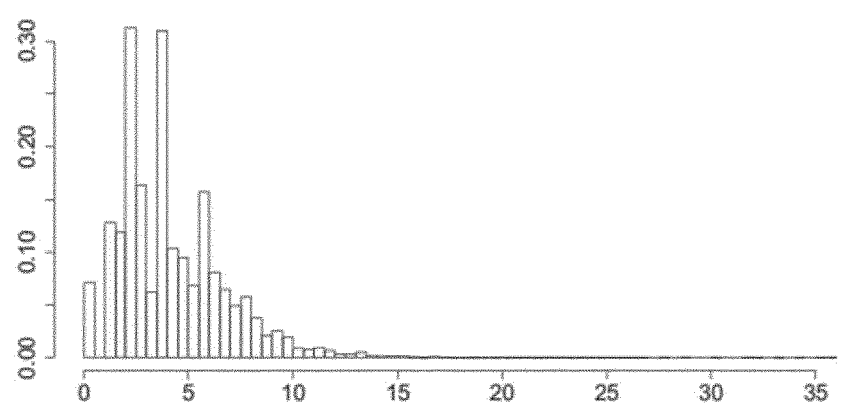
FIG. 6 shows an exemplary probability distribution function corresponding to sample values taken for a static device being affected by error.

Note that the function of FIG. 6 represents the distance in absolute terms, since the probability distribution function of $v^{(i)}(n)$ given no movement is symmetric about zero (the probability of falsely measuring a movement in direction $\vec{v}$ is the same as the probability of falsely measuring a movement in direction $-\vec{v}$).

Since the actual movement is zero ($v^{(i)}_{Real}(n)=0$), the measured velocity value corresponding to the static node may be expressed as:

$$v^{(i)}(n)=e^{(i)}(n+1)-e^{(i)}(n),v_{Real}^{(i)}(n)=0$$

where:

$$v_{Real}^{(i)}(n)=x_{Real}^{(i)}(n+1)-x_{Real}^{(i)}(n)$$

In other words, the value of $v^{(i)}(n)$ in the case of a static node is associated only with the difference in consecutive error measurements, which tend to change only slowly. One consequence of this is that the probability of detecting a large measured $v^{(i)}(n)$, in the case that there is no real movement is low. Hence, in the case that high speed movements are of interest (such as in the case of landslides for instance), the significance of errors in the final measured value is reduced.

Despite this, the presence of errors means that it cannot be assured that in the case of a real ground or soil movement, this event will be detected above the background noise. One approach (mentioned in the sections above) is to make use of a threshold velocity value $v_{th}$, and to only consider as true positive values, those measurements $v^{(i)}(n)$ which exceed this threshold, i.e. where $v^{(i)}(n) > v_{th}$. This may increase the probability of detecting a real movement event ($P_{detection}$).

One difficulty however is in determining an appropriate or optimum threshold value $v_{th}$. Given a true ground/soil movement of velocity v, a given node may, depending upon the character of the experienced errors, return a measured/detected value of $v^{(i)}(n)$ which is either greater than the true value or less than the true value. Consecutive error measurements may potentially either increase or reduce the measured/observed ground velocity. Based on this, $P_{detection}$ will depend upon the probability distribution function of the difference in consecutive errors in a given moment.

In selecting an optimal $v_{th}$, it is of value to consider a number of the primary sources of error in more detail.

Considering, by way of example, the case of a real movement event having a small magnitude occurring over a short period of time, it may be reliably assumed that the rate of change of observed global error values will be approximately the same as in the case where no movement event is occurring, i.e.

$$e_{global}^{(i)}(n+1)-e_{global}^{(i)}(n),v_{Real}^{(i)}(n)=0 \sim e_{global}^{(i)}(n+1)-e_{global}^{(i)}(n),\|v_{Real}^{(i)}(n)\|>0$$

The same may also be assumed for local errors associated only with the receiver (rcvr (receiver))—since the internal workings of the node itself do not change dependent upon their velocity:

$$e_{rcvr}^{(i)}(n+1)-e_{rcvr}^{(i)}(n),v_{Real}^{(i)}(n)=0 \sim e_{rcvr}^{(i)}(n+1)-e_{rcvr}^{(i)}(n),\|v_{Real}^{(i)}(n)\|>0$$

However, the same cannot be assumed for multipath errors (errors resulting from the detection of multiple GPS signals from a given satellite due to reflections). That is to say, the change in consecutive multipath error values over time may be different in the case that the node is in motion, as opposed to if it is static. In particular, two consecutive multipath error samples in time may be expected to be very similar if the node is static. However, if movement is occurring, the difference between consecutive error values will increase.

Based on this, a change in the node's true position, may imply a bigger change in the difference of consecutive measured multipath errors:

$$\|e_{multipath}^{(i)}(n+1)-e_{multipath}^{(i)}(n)\|<e_1,v_{Real}^{(i)}(n)=0$$

$$\|e_{multipath}^{(i)}(n+1)-e_{multipath}^{(i)}(n)\|>e_1,v_{Real}^{(i)}(n)=0$$

where $e_1$ is a reference value.

In this case, the probability distribution function of the difference in consecutive error measurements, given true movement, will be more scattered. The probability therefore that consecutive multipath error values will be measured as highly similar in the case of true movement is very low. Therefore, a sudden observed significant increase in measured $v^{(i)}(n)$ values may be indicative that true motion is occurring, in the case that the observed $v^{(i)}(n)$ is not too high. Observation on the other hand of a low-level background measured $v^{(i)}$ which remains roughly static may be indicative of merely noise. Looking for sudden changes in measured v values may (in certain cases) enable identification of true motion.

It can be seen from this that the setting of a minimum threshold which measured v values are required to meet, may be an effective strategy in eliminating false positives. It can help identify values representing true movement events by excluding those (falling below a particular threshold) which would be expected to be measured in any event merely as a result of persistent background errors. Such an approach is effective, since, as seen above, the background errors do not tend to change significantly unless there is true movement.

In selecting a $v_{th}$, further considerations may be of relevance. In particular, it may be of value to consider the probability function for accurately detecting a true movement event, even once a threshold has been applied.

Consider for example a threshold value of $v_{th}$, such that a node is configured to return as possible movement events only those measurements which satisfy $\|v^{(i)}(n)\| > v_{th}$. In determining a probability function for successfully detecting a true movement event, one may define two boundaries for the incurred total error value:

$e_{min}=v-v_{th}$ in the opposite direction to the real movement. If the difference in consecutive measured error values is equal to $e_{min}$, then $v^{(i)}(n)=v-(v-v_{th})=+v_{th}$. Since the node is configured to only return as possible true movement events, values exceeding $v_{th}$, then this event will not be detected.

$e_{max}=v+v_{th}$ in the opposite direction to the real movement. If the difference in consecutive measured error values is equal to $e_{max}$, then $v^{(i)}(n)=v-(v+v_{th})=-v_{th}$. Again, this movement event will not be detected.

If a movement v needs to be detected, then it is necessary to consider the worst case: A difference in consecutive error measurements between $e_{min}$ and $e_{max}$ in an opposite direction to the real movement. This probability of detecting a movement may be expressed as follows:

$$P_{detection}=1-P((e^{(i)}(n+1)-e^{(i)}(n))\in[-e_{min},-e_{max}] \| \|v_{Real}^{(i)}(n)\|=v)$$

From this, two factors emerge as significant considerations in determining an appropriate $v_{th}$:

Difference between the real movement, v, and the selected velocity threshold, $v_{th}$. If this difference is large, $P_{detection}$ will increase.

Value of v. If only large movements need to be detected then, $P_{detection}$ will also increase (in the probability distribution function of the difference in consecutive error measurements given movement, $e_{min}$ and $e_{max}$ will be far from zero (where the probability has higher values), reducing the probability of no detection).

It has been seen that in real world scenarios, although a node is placed in a static location, it will return measured velocity values greater than 0 due to incurred errors. As discussed above, the probability of measuring a very large $v^{(i)}(n)$ (i.e. where $\|v^{(i)}(n)\| > v_{th}$) is very low in the case that there is no actual movement:

$$P(\|v^{(i)}(n)\| > v_{th} | v_{Real}^{(i)}(n) = 0) < p_a$$

where $p_a$ is an arbitrary reference.

This probability can be seen in Table 2 below, which indicates that as the selected value of $v_{th}$ increases, so the number of samples indicating $v^{(i)}(n) > v_{th}$ in the absence of any motion, decreases:

TABLE 2

| | $v_{th}$ (cm/s) | | | | | |
|---|---|---|---|---|---|---|
| | 1 | 2 | 5 | 10 | 15 | 20 |
| $P(\|(v^{(i)}(n))\| > v_{th}\|v_{Real}^{(i)}(n) = 0)$ | 0.964 | 0.841 | 0.317 | 0.026 | 0.002 | 0.0002 |

It can further be seen from the above description however, that using only a single node, it remains very difficult to detect with high reliability the occurrence of movement in an area. Too low a threshold may allow too many false positives; too high a threshold may cause too many false negatives.

It may be preferable in some cases therefore to make use of data from a plurality of individual nodes, using correlations in the velocity values measured across all of them as indicative of true movement events.

Considering a group of GPS receivers, deployed in close vicinity to one another, it may be assumed that each of the receivers will be affected by roughly identical global errors. However, local errors will not be correlated, since these depend upon the location of the node as well as the local electronics inside it. These factors will be different for each device. Therefore, the outputs $\|v^{(i)}(n)\| > v_{th}$ of a set N of (closely positioned) GPS receivers may be considered as independent random variables, since the correlation in values of velocity greater than $v_{th}$ is low in the case of no real movement (getting lower for increasing threshold). Therefore, the probability of a large velocity being detected jointly across all N nodes in the absence of any real movement is very low:

$$P(\|v^{(i)}(n)\| > v_{th} | v_{Real}^{(i)}(n) =, \forall i \in N) = \prod_{i=1}^{N} P(\|v^{(i)}(n)\| > v_{th} | v_{Real}^{(i)}(n) = 0) < p_b$$

where $p_b < p_a$.

This demonstrates that the outputs of multiple GPS receivers are highly unlikely to measure a large velocity simultaneously with a high probability if there is no true movement. Table 3 below shows how the probability of correlated movements of two nodes decreases as the velocity threshold $v_{th}$ increases, in the absence of any true movement:

TABLE 3

| $v_{th}$ (cm/s) | 1 | 2 | 5 | 10 | 15 |
|---|---|---|---|---|---|
| #Nodes = 2 | 96.03% | 82.67% | 30.67% | 5.17% | 0.97% |

According to the above therefore, by combining a large enough sample of nodes and selecting an appropriate velocity threshold $v_{th}$, it should be possible to eliminate or discount a large proportion of measured samples which do not relate to a real movement event.

It can be seen from the above analysis that critical considerations in ensuring accurate detection of the occurrence of movement events include the following:

Selecting the optimum velocity threshold, $v_{th}$, for ensuring a good probability of detecting a movement ≥v, being v>$v_{th}$ Selecting the optimum number of nodes, N, for eliminating from results all uncorrelated movements (those arising not from true motion, but from local errors).

Depending upon the requirements of the particular application (i.e. what range of velocity values v are required to be detected) different values for these parameters may be more or less appropriate. Further to this, the capabilities of the node, as well as the costs of communication between the node and the central processing unit (the backend) provide added constraints to consider for the final system. Use of a small total number of nodes and sending only very few movement measurements to the backend (e.g. selecting high a $v_{th}$ cut-off threshold) may reduce considerably the final price of the application.

The following basic steps may be carried out:

1. Knowing that an area is not subjected to a strong movement (e.g., an earthquake), the minimum number of nodes for removing false movements using different velocity thresholds can be determined (detect how many nodes are needed until removing all false movements for each $v_{th}$ less than v).

2. Depending upon the minimum velocity value to be detected (v), and knowing that, as the difference between v and $v_{th}$ increases, $P_{detection}$ also increases, final velocity threshold is selected (best case is selecting the lowest value of $v_{th}$ (>0) assuming that the number of used nodes as well as the communication cost are not constraints).

Note that increasing the number of nodes reduces the probability of detecting a false movement jointly across all of them. Hence, if, after removing the false movements, a high percentage of the nodes return positive movement values at the same time, then there is a high probability that a real movement event is occurring.

The above discussion has focused on reliable detection of the occurrence of movement events, making use in particular of threshold values, and correlations across a plurality of nodes. In the following, it is discussed how the use of a large number of nodes may increase the accuracy in determining the specific magnitude of a detected movement event, in particular by using averaging to eliminate or reduce many potential sources of error.

It is known that in the case of Gaussian white noise (noise in which there is no correlation or pattern among the error value), the spread of the error values may be reduced by taking a large number of samples:

$$\sigma_{e_2} = \frac{\sigma_{e_1}}{\sqrt{L}}$$

where $\sigma_{e_1}$ is the original deviation of the error, and $\sigma_{e_2}$ the new deviation after averaging L samples.

Figure 7:
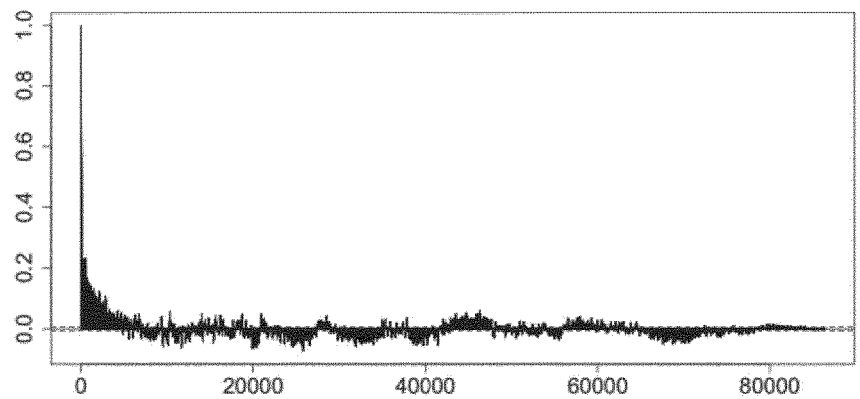
FIG. 7 which shows a graph of the autocorrelation coefficient as a function of time lag between consecutive samples.

However, the existence of colored noise in the GPS measurements of a single receiver may render this approach infeasible, since there is a pattern or correlation between the errors (they are not Gaussian distributed). The presence of colored noise is illustrated in FIG. 7 which shows a graph of the autocorrelation coefficient (y-axis) as a function of time lag between consecutive samples (x-axis, in seconds). The graph shows that there is a strong correlation with adjacent samples in time. (See also Table 4 below).

TABLE 4

Autocorrelation coefficients (Latitude) [Units: s (seconds), m (minutes)]

| | Interval | | | | | | | | |
|---|---|---|---|---|---|---|---|---|---|
| | 1 s | 2 s | 3 s | 4 s | 5 s | 1 m | 5 m | 10 m | 30 m |
| Co-efficient | 1 | 0.999 | 0.997 | 0.994 | 0.990 | 0.382 | 0.197 | 0.183 | 0.095 |

For the following analysis, it is assumed that a subset of the G receivers forming the network (denoted by N) have moved a small distance d (same magnitude and direction). Based on the above description, by considering only one node in computing the amount of the movement, it may not be possible to adequately reduce the degree of error. Due to the presence of colored (i.e. systematic) noise, a large number, N, nodes is required to reduce the error to more acceptable levels.

Considering a fixed node i, returning L position measurements, the estimated average of that position, $\eta_{x(n)}^{(i)}$, will be:

$$\eta_{x(n)}^{(i)} = x_{Real}^{(i)} + \frac{1}{L}\sum_{n \in L} e^{(i)}(n)$$

where $e^{(i)}(n)$ is the sum of the white and colored noise:
$$e^{(i)}(n) = w^{(i)}(n) + c^{(i)}(n)$$
so that:

$$\eta_{x(n)}^{(i)} = x_{Real}^{(i)} + \frac{1}{L}\sum_{n \in L} w^{(i)}(n) + \frac{1}{L}\sum_{n \in L} c^{(i)}(n)$$

Considering a region of interest (ROI) comprising N nodes, in which a single GPS receiver i is affected by a movement d of a given magnitude and direction, and wherein a set of L position samples is taken both before (B) and after (A) movement, the following equations for an average position before (B) and after (A) movement may be assumed to hold:

$$\eta_{x(n)}^{(i,B)} = x_{Real}^{(i)}(0) + \frac{1}{L}\sum_{n \in B} w^{(i)}(n) + \frac{1}{L}\sum_{n \in B} c^{(i)}(n)$$

$$\eta_{x(n)}^{(i,A)} = x_{Real}^{(i)}(0) + d + \frac{1}{L}\sum_{n \in A} w^{(i)}(n) + \frac{1}{L}\sum_{n \in A} c^{(i)}(n)$$

where $x_{Real}^{(i)}(0)$ is the real position of the node before movement.

Extracting $\hat{d}^{(i)}$:

$$\hat{d}^{(i)} = d + \frac{1}{L}\sum_{n \in A} w^{(i)}(n) - \frac{1}{L}\sum_{n \in B} w^{(i)}(n) + \frac{1}{L}\sum_{n \in A} c^{(i)}(n) - \frac{1}{L}\sum_{n \in B} c^{(i)}(n)$$

After a large L number of samples, white noise will tend to zero:

$$\frac{1}{L}\sum_{n \in A} w^{(i)}(n) \approx 0$$

$$\frac{1}{L}\sum_{n \in B} w^{(i)}(n) \approx 0$$

Even after many (L) samples, colored noise may not completely tend to zero. To further remove the remaining error, information may be combined from a plurality of nodes (N), under the assumption that they have each experienced the same movement d in both magnitude and direction:

$$\hat{d}^{(1)} = d + \frac{1}{L}\sum_{n \in A} c^{(1)}(n) - \frac{1}{L}\sum_{n \in B} c^{(1)}(n)$$

$$\hat{d}^{(2)} = d + \frac{1}{L}\sum_{n \in A} c^{(1)}(n) - \frac{1}{L}\sum_{n \in B} c^{(2)}(n)$$

$$\vdots$$

$$\hat{d}^{(N)} = d + \frac{1}{L}\sum_{n \in A} c^{(N)}(n) - \frac{1}{L}\sum_{n \in B} c^{(N)}(n)$$

Since the colored noise experienced by each GPS receiver may be considered as an independent variable, so, by the Central Limit Theorem, the noise experienced across the whole N nodes can be assumed to follow a normal distribution. (Note that the more distant the receivers are relative to one another, and the longer the time period over which samples are taken, the closer the noise distribution will approximate a normal distribution).

Given this, applying the arithmetic mean to the movement values $\hat{d}(j)$ will tend to eliminate the colored noise errors (since for a normally distributed set of values, they will tend to cancel out), and hence provide a good estimation of the movement:

$$\hat{d} = \frac{1}{N}\sum_{i=1}^{N} \hat{d}^{(i)} \approx d$$

The above discusses how position estimates of multiple devices can be combined to estimate the amount of movement. In the particular examples discussed so far, the mean has been applied in order to reduce error. However, in the case that the errors follow a non-symmetric probability distribution function, and in particular, where a single node is used, the median algorithm may be a preferable option since it allows for the elimination of outliers. After sorting the distance measurements $\hat{d}(j)$, if the number of nodes is odd:

$$\hat{d} = \hat{d}\left(\frac{N+1}{2}\right)$$

and if the number of nodes is even:

$$\hat{d} = \frac{\hat{d}\left(\frac{N}{2}\right) + \hat{d}\left(\frac{N}{2}+1\right)}{2}$$

Hence, by selecting an appropriate averaging means, and utilizing data from a large enough range of sample nodes, and taking a large enough number of samples from each, both white and colored noise may be substantially reduced.

Further means may also be implemented to further reduce residual errors. In particular, rather than solely using nodes which have moved, a nearby static device may be implemented in order to measure the relative movement of the region of interest with respect to that static reference station (RS). This method may improve considerably the estimation of the movement, since the global errors are potentially removed.

Considering a number N of nodes which have moved a real distance d, the relative distance between a static reference station RS and each one of the N nodes ($r^{(i)}_{RS}(n)$) may be computed as follows:

$$r_{RS}^{(i,B)}(n) = \eta_{x(n)}^{(i,B)} - \eta_{x(n)}^{(RS,B)}$$

for the period before the movement, and $$r_{RS}^{(i,A)}(n) = \eta_{x(n)}^{(i,A)} - \eta_{x(n)}^{(RS,A)}$$

for the period after the movement. Finally, the estimated movement vector $\hat{d}^{(i)}$ may be calculated as:

$$\hat{d}^{(i)} = r_{RS}^{(i,A)}(n) - r_{RS}^{(i,B)}(n)$$

By further applying the mean or median of N estimated movement vectors, as discussed above, most of the local errors may be eliminated.

Additionally, more static reference stations may be utilized in order to reduce the local error present in the one selected static device. Note that the relative position can be computed just using the pseudorange measurements or by applying the Real Time Kinematic's method for example.

In summary, it can be seen from the above discussion that in order to achieve a good estimation of the movement of a region of interest, two main considerations are of particular significance:
  Determining the optimum number of samples, L, for removing/reducing the error affecting the position of the node
  Determining the optimum number of nodes, N, for removing/reducing to an even greater extent the error affecting the movement vector, assuming that all of nodes have experienced the same movement d (both in magnitude and direction).

As mentioned in preceding sections of this document, embodiments of the invention may be advantageously employed in the detection of landslides. In this regard, there follows a discussion in which a number of principles or methods are outlined, which may be implemented in improving the accuracy of the system in detecting landslide events.

A ground movement experienced by one or more devices in a network may be categorized according to one of two broad categories:
  Movements due to the collision of tectonic plates (referred to in this document as 'ordinary' movement events)
  Movements involving landslides—caused for example by heavy rains or gas extractions (referred to in this document as 'extraordinary' movement events).

A movement of a subset of N nodes may be due to the occurrence of a landslide. If the network is large enough, a landslide may occur across only a small part of the total network area (formed by G nodes). In order to distinguish within a large network a moving region of interest from non-moving regions, a suitable classification algorithm may be applied. The below discussion introduces two techniques: one based upon the use of absolute positions and the other based on the use relative positions (distances to reference stations).

An approach based on absolute position will be discussed first. Considering a GPS device i, placed in a location susceptible to be moved, an equation describing the evolution of the position measurement in the case of no movement may be stated as follows:

$$x^{(i)}(n) = x_{Real}^{(i)}(0) + e^{(i)}(n)$$

where $x^{(i)}_{Real}(0)$ corresponds to the real position of the node at time zero.

The error may be expressed as:

$$e^{(i)}(n) = e_{global}^{(i)}(n) + e_{local}^{(i)}(n)$$

so that:

$$x^{(i)}(n) = x_{Real}^{(i)}(0) + e_{global}^{(i)}(n) + e_{local}^{(i)}(n)$$

For global errors, it may be assumed that these will be roughly similar for the G nodes, so long as the overall area covered by the network is not too large:

$$e_{global}^{(1)}(n) \sim e_{global}^{(2)}(n) \sim \ldots \sim e_{global}^{(G)}(n)$$

Considering the case now that the position of several of the GPS devices is changing because of a slow soil movement (which may be indicative of a future landslide), where these nodes are denoted by the index m, with $m \not\in N \not\in G$, the movement corresponding to measurement sample n will be the difference between the current position and the reference:

$$d_0^{(i)}(n) = x_R^{(i)}(n) - x_R^{(i)}(0)$$

Adding this movement to the first equation above:

$$x^{(m)}(n) = x_R^{(m)}(0) + e_{global}^{(m)}(n) + e_{local}^{(m)}(n) + d_0^{(m)}(n)$$

At each subsequent sample n (taken after a given interval from the last) the average of the position values for a group of nodes which are being moved may be computed such that the local errors are considerably reduced:

$$\overline{x^{(m)}}(n) \sim \overline{x_R^{(m)}}(0) + \overline{e^{(m)}}_{global}(n) + \overline{d_0^{(m)}}(n)$$

In order to determine an estimated movement, a group of static reference nodes may further be considered, denoted by the index s, where $s \not\in N \not\in G$:

$$\overline{x^{(s)}}(n) \sim \overline{x_R^{(s)}}(0) + \overline{e^{(s)}}_{global}(n)$$

The regression lines for $\overline{x^{(m)}}(n)$ and $\overline{x^{(s)}}(n)$ may each be computed (i.e. the gradient with respect to n may be calculated by means of a least squares regression method), this being divided into two components: $reg_\beta$ for the angle, and $reg_\gamma$ for the magnitude. Subtracting both components, the estimated movement may be obtained:

$$reg_{\beta,\overline{d_0^{(m)}}(n)} \sim \left( reg_{\beta,\overline{x^{(m)}}(n)} - reg_{\beta,\overline{x^{(s)}}(n)} \right)$$

$$reg_{\gamma,\overline{d_0^{(m)}}(n)} \sim \left( reg_{\gamma,\overline{x^{(m)}}(n)} - reg_{\gamma,\overline{x^{(s)}}(n)} \right)$$

Having a network of G devices, where a small number of them are moving and the remainder is fixed, the angle and magnitude for the computed regression line for the moving modes m will be slightly different to the regression lines for the static nodes s.

Based on this assumption, a soil movement may potentially be detected, by identifying regression lines which differ from the mean of the overall region (which will be dominated by the absence of movement).

Note that both subsets of nodes (s and m) will typically experience in addition an ordinary movement (not landslide-related) due to tectonic effects. This movement has no effect on the above method, since it simply corresponds to a constant error (having no effect on the calculated regression lines).

A further method for detecting an extraordinary movement event (one indicative of a landslide, rather than tectonic activity), relates to consideration of relative motion of a set of G nodes (i.e. the distances between nodes in a network, or region of a network).

In the absence of any landslide, the relative distances between nodes will remain constant, while in the case of a landslide, the relative distances will typically change over time.

A node which is not moving (s) will typically be affected by two kinds of error:

$$x^{(s)}(n) = x_{Real}^{(s)} + e_{local}^{(s)}(n) + e_{global}^{(s)}(n)$$

where $x_{Real}$ remains constant for this static node. In the case of a moving node (m):

$$x^{(m)}(n) = x_{Real}^{(m)}(n) + e_{local}^{(m)}(n) + e_{global}^{(m)}(n)$$

Making the assumption that the two nodes are near enough to one another that the global errors may be assumed to be similar, then the distance d traveled by a moving node at a time corresponding to sample n may be computed as follows:

$$\hat{d}_{s,m}(n) = x^{(m)}(n) - x^{(s)}(n) = (e_{local}^{(m)}(n) - e_{local}^{(s)}(n)) + (x_{Real}^{(m)}(n) - x_{Real}^{(s)})$$

By combining several nodes, the local error may be significantly reduced, providing thereby a good estimation of the distance between nodes at the time corresponding to sample n:

$$\hat{d}_{s,m}(n) \sim x_{Real}^{(m)}(n) - x_{Real}^{(s)}$$

Since the set of m nodes are moving, the distance 4. (n) changes over time so that a landslide may be readily detected by identifying where the corresponding regression line (distance with respect to sample number n) has a slope different from zero.

A further approach may also be applied to the detection of landslides which may further reduce the incurred error. This method involves using clusters of nodes.

Since the nodes are likely to be affected by several sources of error, a clustering algorithm for removing/reducing the error can be applied. Considering an area comprising G nodes, a set V of clusters may be defined according to the following constraints:

All clusters are defined to include the same number of nodes, N, since the comparisons among clusters must have the same weight (the more equal the conditions between the clusters, the more reliable the outputs). The result obtained by combining the information of N nodes will be referred to as a Virtual Sensor.

Each cluster covers an area of the same size, e.g. a circular area of radius D

All the nodes inside any single cluster will be located in a local area having the same topographical conditions (e.g., consider for any single cluster only nodes located on the slope of a mountain or in a plane terrain). It is possible that a cluster contains for example a subset of nodes placed on a plain terrain and a different subset placed on a mountain, so that only some of them are more subjected to a landslide. Establishing a separation into two cases will give a better estimation of the final results.

Overlapping of clusters is allowed, so that a node may belong to one or more clusters at the same time. This feature provides better results in the defined applications since, although it is being assumed that all of the nodes inside a given cluster are moving in the same direction, some nodes may be located in a locally static place. Allowing a node to belong to different clusters increases the probability of detecting a real movement.

An example clustering algorithm may consist of the following steps:

1. An area A, containing G nodes, is divided in a subset of equally sized regions, r, each defined by a respective center point, c, and a surface constraint, S.

2. For each center $c^{(j)}$, compute the Euclidean distance to all nodes inside the respective region $r^{(j)}$.

3. For each region $r^{(j)}$, select the nearest N nodes to $c^{(j)}$ having the same topographic condition (denoted $c^{(j)}(t^{(j)})$) and thereby define a virtual sensor $vs^{(j)}$. If there does not exist at least N nodes satisfying these conditions, then a virtual sensor is not created for the relevant region $r^{(j)}$.

For maximal accuracy in detecting extraordinary movement events, the following factors may also be considered:

Increasing the number of regions also increases the number of virtual sensors, and hence a larger sample of data may be combined in producing the final result. This may increase the probability of successfully detecting an extraordinary soil movement (landslide).

Depending on the number N of desired nodes and the size of each surface S, there will be defined a greater or lesser total number of virtual sensors. Reducing the number of nodes N per virtual sensor reduces the accuracy of event detection. Increasing the surface size S per region also reduces the probability of detecting a movement event (since the probability of a landslide being experienced across the entirety of a smaller region is greater than the probability of it occurring across the whole of a very large region).

A clustering approach may also be applied to help improve the accuracy of movement detection in the case that relative positions between nodes and defined reference stations is being employed, as opposed to absolute positions. In the case of methods based on monitoring relative motions of nodes, serious errors can arise in the case that reference stations assumed to be static are in fact moving.

To reduce the overall impact of any such errors, clustering can be used, and combined with the use of multiple different defined reference stations. Since the probability that every defined reference station is in fact moving is low, where the measured distance from all of the reference stations to a given node (or cluster of nodes) is simultaneously increasing, then there is a high probability that a true movement event is occurring. If there is observed motion only with respect to one or two of the reference stations, then this may indicate a false positive.

An example set of basic steps for implementing this added constraint may be defined as follows:
1. Divide an area A, containing G nodes, into K small equal regions. Each region may contain different numbers of the previously created clusters, as well as single nodes which have not been selected for belonging to a cluster. The centroid of a cluster (average of N positions) determines its membership to a region. If a region does not have any nodes, then it is not used for the algorithm.
2. Select nRS random reference stations (RS) for each region (the reference station does not have to be included in any cluster).
3. Select a number Y of adjacent regions (close in space).
4. For each region, compute the distance vectors between each adjacent reference station and each of the nodes inside that region. For each cluster, the distance vectors for each of its member nodes is averaged, providing a single distance vector corresponding to the distance from each cluster to each adjacent RS.

Figure 8:
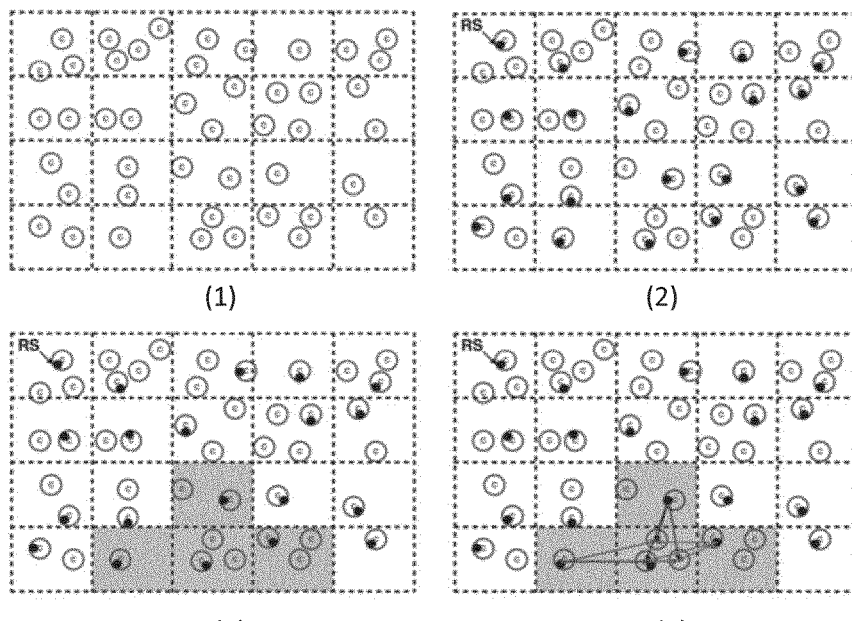
FIG. 8 shows a two-level clustering approach which may be applied to help improve the accuracy of movement detection in the case that relative positions are employed.

These four steps are illustrated schematically in FIG. 8.

Once the distance vectors are computed for each reference station, the algorithm for detecting landslides based on a relative position is applied for each reference station. The results of the algorithm for each reference station may then be compared to determine whether a real movement is occurring (in the case that there is movement relative to all reference stations for instance) or whether there is no movement (in the case that only one or two of the reference stations show positive movement results).

Further points to note in applying this algorithm include the following:
  Although each cluster belongs to a specific region, some nodes of a given cluster may be located inside a neighboring region. In this case, if one of these nodes has been selected as an adjacent reference station for this cluster, then the algorithm selects a new one.
  The area where the GPS receivers are placed may be encountering ongoing tectonic movement activity. However, this activity may not affect all of the regions in precisely the same way. Selecting directly adjacent regions in the above algorithm reduces the probability that these different regions will be experiencing significantly different tectonic movement activity (which could therefore influence measurements of relative distance values).
  Comparing distance vectors among different reference stations and the clusters inside a region can detect whether a reference station is moving. It could be that all the reference stations inside the adjacent regions are moving but the probability of this happening is very low (lower as a function of the number of adjacent regions considered in the calculation).

A number of further auxiliary considerations will now be discussed which are of relevance generally to the improvement of accuracy in methods and principles described above.

Firstly, with regards to the combining or aggregating of position data generated by a plurality of individual devices, different averaging methods may provide greater or lesser accuracy, depending upon the data being considered. In particular, the mean algorithm is useful on some occasions, especially where the probability distribution function of the all measurements is evenly distributed around the real value, which cannot always be assumed in the case of GPS measurements. Depending on the magnitude of the error present in each sample, a greater or lesser quantity of samples will be required to be included in the mean calculation.

Where the probability distribution function for all the measurements is not evenly distributed around the true value, then the median algorithm might be applied instead. This method enables outliers to be eliminated. The median algorithm may give a better estimation of the center of all position measurements, which may improve the quality of all samples for the final system.

A further significant factor to consider is the issue of the sidereal day, and the errors that this can introduce. It is known that every 23 h 56 m 4 s (period of a sidereal day, SD), the geometry of the satellites returns to same configuration relative to a GPS receiver located at a fixed position. Each GPS satellite completes its orbit around the Earth in 11 h 58 m 2 s so, since the Earth is rotating on itself, after a sidereal day the constellation of the satellites will be the same for a given specific fixed node.

Given this, selecting the best period for applying the mean algorithm is important for obtaining the best results. If the period selected is 24 hours then each average value will contain 3 minutes and 56 seconds of samples computed by using a different constellation of satellites. Averaging the position samples in this way implies that a delay of one year would be required in order to once again have the same satellites constellation (3 minutes and 56 seconds multiplied by 365 gives 24 hours). In order to best facilitate the detection of landslides, the same conditions over time should to be applied, so that the average is best calculated using a sidereal day of samples (or a multiple of it). The factor of the sidereal day may also have an impact on which of a set of samples will provide the best results when an averaging method is carried out. A filtering method for identifying the best samples (those which give a good estimation of the position after averaging) may be applied. One example filtering algorithm is described below.

A single node i is first considered, for which two position samples $(x^{(i)}_0)$ and $(x^{(i)}_1)$ are generated, taken at times $t_0$ and $t_1 = t_0 + 23$ h 56 m 4 s, respectively. Assuming no GPS error, then $$x_0^{(i)} = x_1^{(i)}$$

In a real situation however, at times $t_0$ and $t_1$, several sources of GPS error will affect the measured position value, so that:

$$x_0^{(i)} = x_R^{(i)} + e_0^{(i)}$$

$$x_1^{(i)} = x_R^{(i)} + e_1^{(i)}$$

where $x_R$ corresponds to the real position value, and $e_0$ corresponds to the total error incurred at time $t_0$.

Separating the errors and computing the difference between both position measurements:

$$\|e_{0,1}\| = x_1^{(i)} - x_0^{(i)} = (e_{1,multipath}^{(i)} - e_{0,multipath}^{(i)}) + (e_{1,rcvr}^{(i)} - e_{0,rcvr}^{(i)}) + (e_{1,global}^{(i)} - e_{0,global}^{(i)})$$

Given a fixed node, the multipath effect may be assumed to be the same every sidereal day (assuming a constant environment surrounding the receiver), and hence these terms may be removed. Also, since the receiver remains the same, the second term may also be discounted (it will be approximately zero). Since the global errors change over time the last term does is not automatically zero. However, a low filter may be applied for extracting only samples which are very similar after a sidereal day. This means selecting samples such that $\|e_{0,1}\| \le d_{th}$, where $d_{th}$ is a selected threshold.

In selecting an appropriate threshold, two considerations should be taken into account:

The global errors affecting the real position increase as the defined threshold increases Selecting low thresholds decreases the number of samples for the averaging computation (which may reduce the accuracy of the final result).

Further the factor of the sidereal day, an additional general concerns ensuring a substantial uniformity in the environments of all considered nodes. For the most reliable data, all considered nodes should be affected the same (optimal) conditions. Two aspects may be analyzed:

Selection of satellites. For a small area containing N nodes, it is known that they are likely to be affected by similar global errors. Selecting GPS satellites which are viewed by all nodes at the same time guarantees an equal global error. Additionally, it may be of advantage to only accept or consider in calculations measurements taken by a given node when a reasonable number of satellites are being viewed. In this way, the output of the defined applications may estimate the final results with greater accuracy. Additionally, a new parameter may be added to the previously discussed constraints: namely, geometry of the satellites. Lower dilution of precision (DOP) values, for example, may improve the position estimation.

Selection of nodes. Creating clusters of GPS receivers removes the majority of local errors, but the presence of technical failures in some nodes, or bad environments, may have a significant effect on the final results. Characterizing the various nodes in the cluster by analyzing signal to noise ratio, the standard deviation of the measurements and/or the average number of viewed satellites after a defined period of time (e.g. after a day) may enable identification of potentially problematic nodes. These identified nodes may then be excluded from the results of the defined cluster for example.

One further factor which may be taken into account is quantity of data which is collected on the node as well as the total amount of this data which is communicated to the central processing unit (the backend).

One relevant consideration, related to the initial detection of the occurrence of movement events discussed above, is the value for any velocity threshold $v_{th}$ which is chosen. Defining high values of $v_{th}$ guarantees a smaller quantity of data required to either be stored at the node or communicated to the backend. However, a high value of $v_{th}$ may typically also decrease the probability of detecting a fast movement event ($P_{detection}$).

A further consideration concerns the calculation of averages. In order to compute the median value of set of L sample values, all L values must be initially sorted before a median can be identified. In a simplest case, this would imply that an initial buffer for L measurements may be necessary.

To minimize the required storage capacity of the node, a compression algorithm may be applied. This can help to ensure that only a subset of the L values need be stored at any one time, based on the discrete output of the GPS receiver.

Given a fixed node, the GPS receiver will return repeated position measurements with a high probability. Creating a table of the frequency of each position sample reduces considerably the total amount of necessary storage. Additionally, since the median value will be close to the mean one, extraneous outlying samples may be discounted.

Accordingly, an example compression algorithm may comprise the following steps:

1. Take position sample returned by the GPS receiver and compute the distance from a previous mean value (e.g., the position average of the last day)

2. If this distance is greater than a defined threshold (e.g., 30 cm), and if the related position measurement is lower than the mean value, increase a counter (counter) by one. In any other case, store the position measurement and increment its associated counter (counter$_{value}$) by one.

The algorithm is executed for every returned position measurement.

Once a defined time period is reached (e.g. one day), only the most central positions have been stored on the node, along with their related frequency counts. There is also stored a counter indicating how many extraneous samples there are.

The median value will be computed selecting the central position measurement: Once the stored data has been sorted, select the value associated with index $$\frac{\text{period} + 1}{2} - \text{counter}$$

if the period is odd. If the period is odd select instead the value associated with index $$\frac{1}{2}\left(\left(\frac{\text{period}+1}{2} - \text{counter}\right) + \left(\frac{\text{period}}{2} - \text{counter}\right)\right).$$

Note that this algorithm is executed for latitude, longitude and altitude values.

As noted above, another consideration is the quantity of data which is transmitted or communicated to the central processing unit. For routine monitoring purposes, it may be preferred to minimize the quantity of data which is transmitted per unit time. This may be to reduce power consumption of the nodes for example, or to reduce costs, or to minimize load or traffic incurred on the communication network. On the contrary, at times where a possible imminent ground movement event is anticipated, it may be preferred to increase the rate at which data is transferred, i.e. transmit a greater quantity of movement and/or position data per unit time. This may improve resolution of the data that is gathered.

Accordingly, in certain examples, each of the plurality of nodes (lighting units) forming the network may comprise an interface unit providing a two-way communication with the central processing unit. The central processing unit may be configured to communicate with the plurality of nodes, via the communication unit, in order to effect a change in the rate at which each of the nodes transmits data to the central processing unit, in response (for example) to a determined likelihood or anticipation of imminent significant ground movement event(s).

Where nodes are switched by the central processing unit to a higher allowable data transmission rate, the respective nodes may be adapted to alter, in response, the modes or methods by which data is pre-processed at the node. For example, the node may be configured to apply a more complex pre-processing algorithm(s) in the case that higher data transmission is available, and to reduce complexity of pre-processing in the case of lower available data transmission.

The system may hence be dynamically adaptable to changing circumstances and requirements.

In one or more further example embodiments, in addition to a GPS receiver, one or more of the lighting units (nodes) may be provided with further position and/or movement sensing devices. For example, according to at least one set of example embodiments, one or more nodes of the network may further comprise one or more acoustic sensors and/or transmitters (i.e. one or more microphones and/or speakers).

For a network comprising a plurality of nodes being each fitted with a speaker and a microphone, acoustic measurements of relative distance between the nodes may be performed, and this information used to identify the occurrence of ground movements.

For example, at one or more pre-determined times during each day, each node may be configured or controlled to, in turn, emit via its respective speaker an acoustic signal. The remaining nodes are each correspondingly configured to detect this sound by means of their respective microphone and to record the time at which detection occurs. Each of the plurality of nodes may then be adapted to transmit its respective collected detection data to the remote central processing unit (backend) for processing. Based on an estimation of the speed of the sound in the area in which the measurements are taken, the central processing unit may then process the data to determine an estimated relative distance between each of the nodes in the system. Since each node is configured to emit an acoustic signal in turn, calculations can be made for the distance between each and every node in the network (at least for those comprising the additional acoustic sensing and transmission equipment). The speed of sound in the area in which the measurements are made will depend upon a number of environmental factors, such as for example temperature. These variable environmental conditions may in certain examples be directly measured by means of appropriate sensing equipment situated in the area in which the network is located. This sensing equipment may be integrated into one or more of the nodes of the network in addition to means for transmitting the sensor data to the central processing unit. Alternatively, the sensing equipment may be separately installed in dedicated sensing units or stations.

According to alternative examples, the environmental conditions may be indirectly estimated, rather than directly measured, or may be determined by means of third party data, for example local or regional weather forecasting data.

Although an example has been described in which a plurality of nodes in the network each comprise a respective acoustic transmitter (speaker), in alternative examples, a smaller subset of nodes (e.g. one node), may be provided with a speaker, and remaining nodes provided simply with a microphone for sensing acoustic signals. In this case, distances may be estimated between each unit with a speaker and each other unit having a microphone.

Other sensor devices may also be considered. These include for example provision of an accelerometer. These could be included in a plurality lighting units. In this case, the central processing unit may then collate acceleration data from this plurality of lighting units, and use this data to determine for instance a speed of motion of one or more of the units. This may be performed in examples by calculating an integral of the measured acceleration.

In examples, the central processing unit may be configured to compare each determined speed value against a particular threshold. Where for example a pre-determined plural number of units generate data corresponding to a speed exceeding the threshold, this may provide an indication that a ground movement event has occurred.

According to a further set of example embodiments, one or more lighting units (nodes) of the network may comprise a wind sensor. Incorporation of wind sensors may improve accuracy in some cases by enabling identification of erroneous movement measurements caused by application of wind forces rather than movements of the underlying terrain. In example implementations, a plurality of nodes may each include a wind sensor being adapted or operable to measure and transmit wind speed, direction and/or intensity data to the central processing unit. The wind sensors may transmit the data at regular intervals for example.

In the case that a small number of nodes sense a movement or position change, the central processing unit may be configured to compare the sensed movement with simultaneous wind speed data in order to identify whether the two are correlated. This may enable the central processing unit to determine whether the movement may be attributable to the effects of wind forces being applied to the respective lighting unit(s), rather than ground movement events.

In particular, the central processing unit may compare a sensed wind direction at the lighting unit and analyze whether the sensed movement of the lighting unit is in the same direction as the wind. This may provide an indication that the movement is due to wind forces, rather than ground movements. Additionally, the central processing unit may be adapted to compare a sensed wind intensity or speed and compare this with the magnitude or speed of the detected movement of the node. If the two speeds or intensities are comparable (for example fall within some threshold range of disparity of one another), this may provide an indication that the detected movement event is attributable to wind forces rather than to ground movements.

In examples, wind speed and/or direction data of a plurality of nodes may be collated by the central processing unit and compared with corresponding movement and/or position data of said plurality of nodes to identify if the two are correlated.

As discussed above, the system makes use of processing of data. This can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system for detecting localized ground position changes with an overall area, comprising:
   a plurality of lighting units each fixed to the ground and mounted within the overall area, wherein each lighting unit comprises a movement detection and/or positioning system and a transmitter for transmitting movement and/or positioning information to a remote central processing unit; and
   the central processing unit for receiving the movement and/or positioning information from the plurality of fixed lighting units and adapted to process the received positioning information to identify local ground position changes;
   wherein the central processing unit is adapted to identify a local around position change based on position and/or movement information from a plurality of lighting units in close proximity to each other having correlated ground position changes, and optionally wherein the correlated position changes correspond to position changes in the same direction or towards or away from a common point.

2. A system as claimed in claim 1, wherein the central processing unit is adapted to process positioning information by averaging or comparing synchronized position changes of multiple lighting units during a time period.

3. A system as claimed in claim 1, wherein the movement detection and/or positioning system of each lighting unit comprises a positioning system, which pre-processes the position data obtained during an interval of time thereby to derive positioning information to be transmitted.

4. A system as claimed in claim 1, wherein the system further comprises at least one static reference unit comprising a movement detection and/or positioning system and a transmitter for transmitting movement and/or positioning information to the remote central processing unit, and wherein the central processing unit is adapted to identify position changes of one or more of the lighting units relative to the at least one static reference unit, and optionally wherein
   the remote central processing unit is adapted to identify a local ground position change by a process of averaging or comparing determined position changes of a plurality of lighting units relative to the at least one static reference unit.

5. A system as claimed in claim 4, wherein the pre-processing comprises identifying movement and/or position changes at the individual lighting unit, and optionally wherein said identifying comprises computing a mean or median of movement and/or positioning information of the individual lighting unit.

6. A system as claimed in claim 1, further comprising a proxy device, wherein the lighting units are adapted to transmit information to the proxy device, wherein the proxy device is adapted to perform data processing on the information and send the processed information to the remote central processing unit.

7. A system as in claim 1, wherein the lighting units comprise a plurality of sensing technologies to measure the position and/or movement.

8. A method for detecting localized ground position changes with an overall area, comprising:
   transmitting positioning and/or movement information from a plurality of lighting units, each fixed to the ground and mounted within the overall area, to a remote central processing unit;
   at the central processing unit, processing the received movement and/or positioning information to identify local ground position changes
   at the remote central processing unit, identifying a local around position change based on position data from a plurality of lighting units in close proximity to each other having correlated around position changes.

9. A method as claimed in claim 8, comprising, at the remote central processing unit, processing positioning information by averaging or comparing synchronized position changes of multiple lighting units during a time period.

10. A method as claimed in claim 8, comprising determining from the correlation information ground position changes for a plurality of lighting units in the same direction or towards or away from a common point.

11. A method as claimed in claim 8, comprising identifying a local ground position change based on a minimum percentage of lighting units within a localized area having a correlated ground position change with an amount of position change exceeding a threshold.

12. A method as claimed claim 8, comprising pre-processing position data obtained during an interval of time thereby to derive the positioning information to be transmitted, wherein the pre-processing for example comprises averaging.

13. A computer program comprising code means adapted to perform the method of claim 8 when said program is run on a computer.

* * * * *